United States Patent
Marti et al.

(10) Patent No.: US 11,934,160 B2
(45) Date of Patent: *Mar. 19, 2024

(54) CONTEXT DRIVEN ROUTINE PREDICTION ASSISTANCE

(71) Applicant: Apple Inc., Cupertino, CA (US)

(72) Inventors: Lukas M. Marti, Santa Clara, CA (US); Lili Cao, Sunnyvale, CA (US); Michael P. Dal Santo, San Francisco, CA (US)

(73) Assignee: Apple Inc., Cupertino, CA (US)

(*) Notice: Subject to any disclaimer, the term of this patent is extended or adjusted under 35 U.S.C. 154(b) by 474 days.

This patent is subject to a terminal disclaimer.

(21) Appl. No.: 17/035,450

(22) Filed: Sep. 28, 2020

(65) Prior Publication Data

US 2021/0011440 A1   Jan. 14, 2021

Related U.S. Application Data

(63) Continuation of application No. 14/868,239, filed on Sep. 28, 2015, now Pat. No. 10,788,800.

(Continued)

(51) Int. Cl.
  *G05B 15/02* (2006.01)
  *G06N 7/01* (2023.01)
  (Continued)

(52) U.S. Cl.
  CPC .............. *G05B 15/02* (2013.01); *G06N 7/01* (2023.01); *G06N 20/00* (2019.01); *H04L 12/282* (2013.01);
  (Continued)

(58) Field of Classification Search
  CPC .............. G05B 15/02; H04M 1/72569; H04L 2012/2841
  See application file for complete search history.

(56) References Cited

U.S. PATENT DOCUMENTS

| 5,611,050 A | 3/1997 | Theimer et al. |
| 2004/0003051 A1 | 1/2004 | Krzyzanowski et al. |

(Continued)

FOREIGN PATENT DOCUMENTS

FR    2852173    9/2004

OTHER PUBLICATIONS

International Search Report and Written Opinion in International Application No. PCT/US2016/034334, dated Aug. 30, 2016, 11 pages.

(Continued)

*Primary Examiner* — Li Wu Chang
(74) *Attorney, Agent, or Firm* — Aikin & Gallant, LLP

(57) ABSTRACT

A mobile device can provide predictive user assistance based on various sensor readings, independently of or in addition to a location of the mobile device. The mobile device can determine a context of an event. The mobile device can store the context and a label of the event on a storage device. The label can be provided automatically by the mobile device or by the external system without user input. At a later time, the mobile device can match new sensor readings with the stored context. If a match is found, the mobile device can predict that the user is about to perform the action or recognize that the user has performed the action again. The mobile device can perform various operations, including, for example, providing user assistance, based on the prediction or recognition.

20 Claims, 10 Drawing Sheets

Related U.S. Application Data

(60) Provisional application No. 62/171,426, filed on Jun. 5, 2015.

(51) Int. Cl.
| | |
|---|---|
| *G06N 20/00* | (2019.01) |
| *H04L 12/28* | (2006.01) |
| *H04M 1/72454* | (2021.01) |
| *H04W 4/02* | (2018.01) |
| *H04W 4/021* | (2018.01) |
| *H04W 4/029* | (2018.01) |

(52) U.S. Cl.
CPC .... *H04L 12/2827* (2013.01); *H04M 1/72454* (2021.01); *H04W 4/021* (2013.01); *H04W 4/023* (2013.01); *H04W 4/029* (2018.02); *H04L 2012/2841* (2013.01)

(56) References Cited

U.S. PATENT DOCUMENTS

| | | |
|---|---|---|
| 2010/0069115 A1 | 3/2010 | Liu |
| 2013/0150117 A1 | 6/2013 | Rodriguez et al. |
| 2013/0210480 A1 | 8/2013 | Pollington et al. |
| 2013/0346347 A1 | 12/2013 | Patterson et al. |
| 2014/0052680 A1 | 2/2014 | Nitz et al. |
| 2014/0171039 A1 | 6/2014 | Bjontegard |
| 2016/0041573 A1 | 2/2016 | Chen et al. |
| 2016/0048712 A1* | 2/2016 | Butler ............... G06K 7/10198 |
| | | 340/10.51 |
| 2016/0322078 A1 | 11/2016 | Bose et al. |
| 2019/0166333 A1* | 5/2019 | Kim ................ G08B 13/19684 |

OTHER PUBLICATIONS

Chavez E et al: "SAMOA: An experimental platform for Situation-Aware Mobile Assistance", Internet Citation, 1998, XP002167637, Retrieved from the internet: http://www.rostock.igd.fhg.de/"imc98/proceedings.html [retrived on May 17, 2001], the whole document.

* cited by examiner

CONTEXT DRIVEN ROUTINE PREDICTION ASSISTANCE

CROSS-REFERENCE TO RELATED APPLICATION

This application is a continuation of U.S. patent application Ser. No. 14/868,239, filed Sep. 28, 2015, now issued as U.S. Pat. No. 10,788,800, which claims the benefit of priority of U.S. Provisional Patent Application No. 62/171,426, flied Jun. 5, 2015, the entire contents of which are incorporated herein by reference.

TECHNICAL FIELD

This disclosure relates generally to providing user assistance in a user's daily routine.

BACKGROUND

Some modern mobile devices can record a series of locations the mobile device has visited upon user request. Based on the recorded location, the mobile device can predict where a user of the device will likely visit at given time. The mobile device can then provide various predictive user assistance services for the user who elects to receive the services. For example, upon user request, a mobile device can determine a location that a user visits daily at a given hour and predict that the user will visit the same location at the same hour on a given day. In response, the mobile device can provide user assistance ahead of the hour on that day, e.g., by providing an alert to the user prompting the user to leave for that location earlier than usual upon determining that, on that given day the traffic conditions on a path to that location are worse than usual. Conventionally, the predictive user assistance services can be based on an estimation of whether a user will visit the location and at what time.

SUMMARY

Techniques for data-driven context determination are disclosed below. A mobile device can provide predictive user assistance based on various sensor readings, independently of, or in addition to, locations previously recorded by the mobile device. The mobile device can determine a context of an event. The event can be an action performed by a user using the mobile device or using an external system other than the mobile device. The mobile device can record readings of multiple sensors of the mobile device at time of the event and designate the recorded sensor readings as the context of the event. The mobile device can store the context and a label of the event on a storage device. The label can be associated with the event. At a later time, the mobile device can match new sensor readings with the stored context. If a match is found, the mobile device can predict that the user is about to perform the action or recognize that the user has performed the action again. The mobile device can respond by performing various operations, including, for example, providing user assistance based on the prediction or recognition.

The features described in this specification can achieve one or more advantages. For example, a mobile device implementing the techniques described in this specification can provide predictive user assistance for users who perform routine tasks at multiple locations. The mobile device can provide assistance when location information is unavailable, for example, when the mobile device is located in a home inside a multi-story building. The information collection can be data driven and unsupervised without requiring a user to perform a survey of a venue or requiring a user to enter various labels manually. In some example applications, the mobile device can recognize various rooms in a house even though a respective geographic location of each room cannot be determined. Accordingly, for example, the mobile device can remind a user that a light or a stove remains on in a kitchen when the user enters a bedroom. The mobile device can configure itself to match users with different habits, and categorize various entities, events and venues accordingly. The mobile device can achieve each of the advantages without knowing geographic locations of the mobile device.

The details of one or more implementations of the subject matter are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Exemplary Context Data

Figure 1:
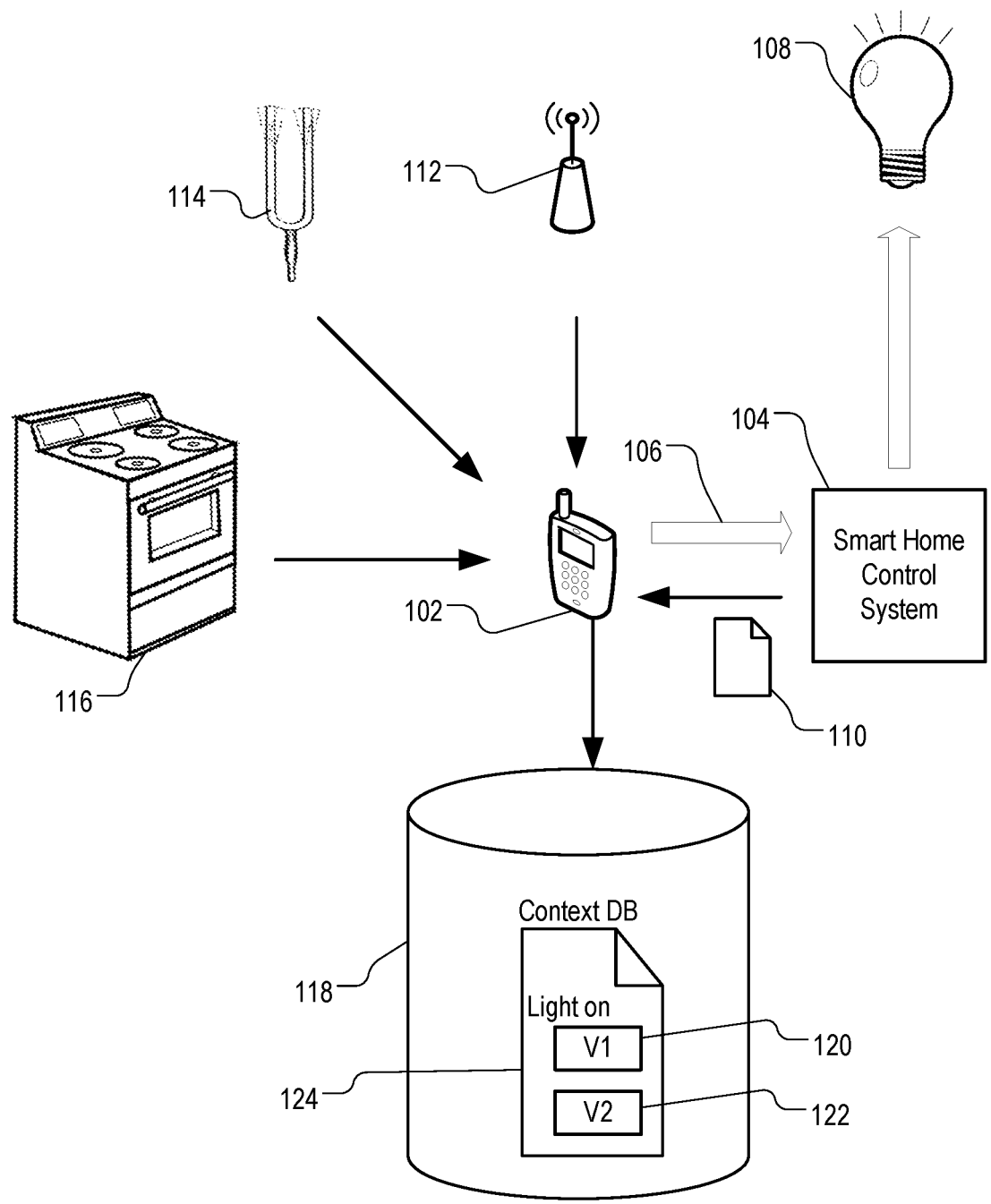
FIG. 1 is a diagram illustrating an exemplary mobile device determining context data for an event.

FIG. 1 is a diagram illustrating exemplary mobile device 102 determining context data for an event. Mobile device 102 can interact with external system 104 to perform action 106, or detect a user interaction with external system 104 to perform action 106. Mobile device 102 can be a device that has received user authorization to determine and use event context data. External system 104 can be a smart home controlling system controlling one or more appliances of a home or office. The appliances can include, for example, a light 108, a garage door or a kitchen stove. Action 106 can be a user act of controlling an appliance, e.g., turning on light 108 or opening a garage door using external system 104. For example, the user can turn on light 108 using a user interface of external system 104 displayed on mobile device 102. Alternatively, the user can turn on a light using a user interface of external system 104 displayed on a television or a desktop, laptop, or tablet computer.

External system 104 can provide label 110 to mobile device 102. Label 110 can be a text or binary information item characterizing, describing, or identifying action 106. For example, label 110 can be a message broadcast to nearby devices by external system 104 through a wireless channel for near-field communication after a user turns on light 108 using external system 104. The message can include a text snippet "turning on living room light" previously associated with action 106 by a user or by external system 104. In some implementations, label 110 can be a text string previously stored on mobile device 102 associated with a user interface item for interacting with external system 104.

Mobile device 102 can obtain various sensor readings of an environment in which action 106 is performed. For example, mobile device 102 can record readings of a wireless receiver of mobile device 102. The readings can include received signal strength indicators (RSSIs) of one or more wireless signal sources 112. The one or more signal sources 112 can include, for example, wireless access points, near-field communication (NFC) beacons, or cellular towers. Likewise, mobile device 102 can record readings of a microphone of mobile device 102 measuring ambient sounds from one or more sound sources 114. Mobile device 102 can record readings of a thermometer of mobile device measuring ambient temperature generated by one or more heat sources 116. Obtaining the sensor readings can be continuous or can be triggered by action 106.

Mobile device 102 can store the sensor readings obtained in context database 118. Mobile device 102 can store the sensor readings as one or more sensor vectors 120 and 122. Each of the sensor vectors 120 and 122 can correspond to one set of sensor readings and be associated with a same or different label, for example, label 110, or a value (e.g., hash value) representing label 110. The sensor vectors 120 and 122 and associated label 110 can be designated as context vector 124 of action 106. Mobile device 102 can store multiple context vectors in context database 118, each context vector corresponding to a different action or a different type of action. Mobile device 102 can create and store the context vectors without user intervention, other than the initial user input authorizing mobile device to create and store the context vectors. Exemplary ways of how mobile device 102 may use the stored context vectors are described in additional detail in reference to FIG. 2.

Figure 2:
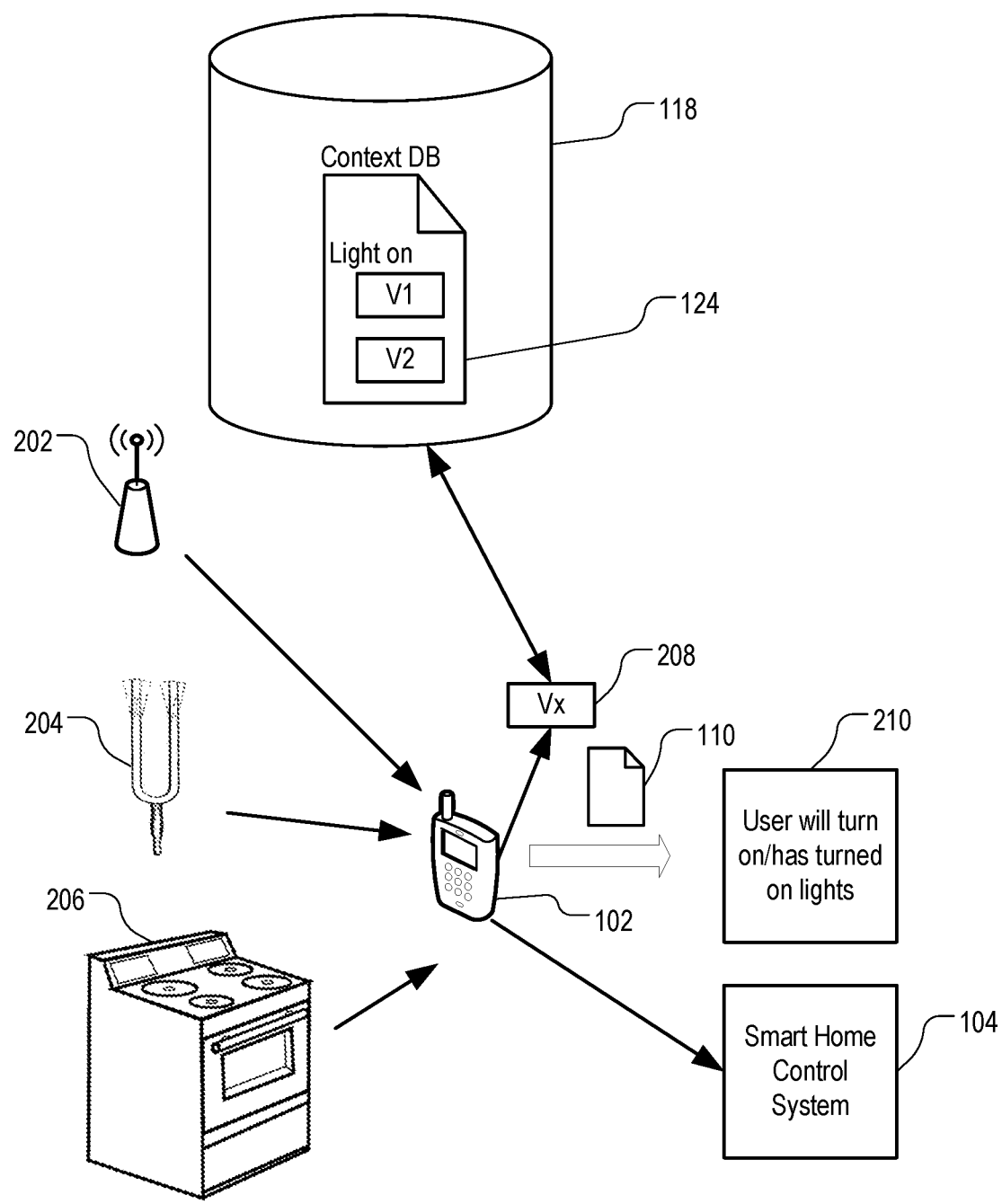
FIG. 2 is a diagram illustrating an exemplary mobile device predicting or recognizing a user action using sensor measurements and stored context data.

FIG. 2 is a diagram illustrating exemplary mobile device 102 predicting or recognizing a user action using sensor measurements and stored context data. Mobile device 102 can obtain, from various sensors of mobile device 102, readings on an environment in which mobile device 102 is located. The readings can include, for example, temperature readings, sound level readings and readings on wireless signals received by mobile device 102. These readings can be affected by one or more signal sources 202, sound sources 204, and heat sources 206. The signal sources 202, sound sources 204 and heat sources 206 may be the same as, or different from, the signal sources 112, sound sources 114, and heat sources 116 of FIG. 1.

Mobile device 102 can determine sensor vector 208 representing the readings. Sensor vector 208 can be a collection of sensor readings arranged in a pre-defined format that maps to a format of context vectors stored in context database 118. Mobile device 102 can search the context database 118 for a context vector that matches sensor vector 208. Searching context database 118 can include performing a statistical match between stored context vectors and sensor vector 208. Mobile device 102 can perform the match by modeling observation noise and evaluating a likelihood function. In some implementations, the search can be based on categories, where the stored context vectors are organized in multiple categories and subcategories. Mobile device 102 can determine a category and subcategory of sensor vector 208, e.g., based on whether sensor vector 208 is predominated by motion readings, sound readings, or temperature readings to be categorized as a motion vector, sound vector or heat vector. Mobile device 102 can then compare sensor vector 208 with context vectors in a corresponding category. In various implementations, the search can be a linear or binary search, comparing sensor vector 208 with one or more context vectors in a category or subcategory.

In the example shown, mobile device 102 identifies a match between sensor vector 208 and context vector 124 associated with label 110 and corresponding to action 106 of FIG. 1. As a result, mobile device 102 can make determination 210 that a user of the mobile device will perform action 106 or has performed action 106 at time mobile device 102 took the readings in sensor vector 208. Determination 210 can trigger various functions of mobile device 102, including, for example, displaying a user interface for interacting with external system 104, displaying an alert or reminder or executing a user-specified application.

Figure 3:
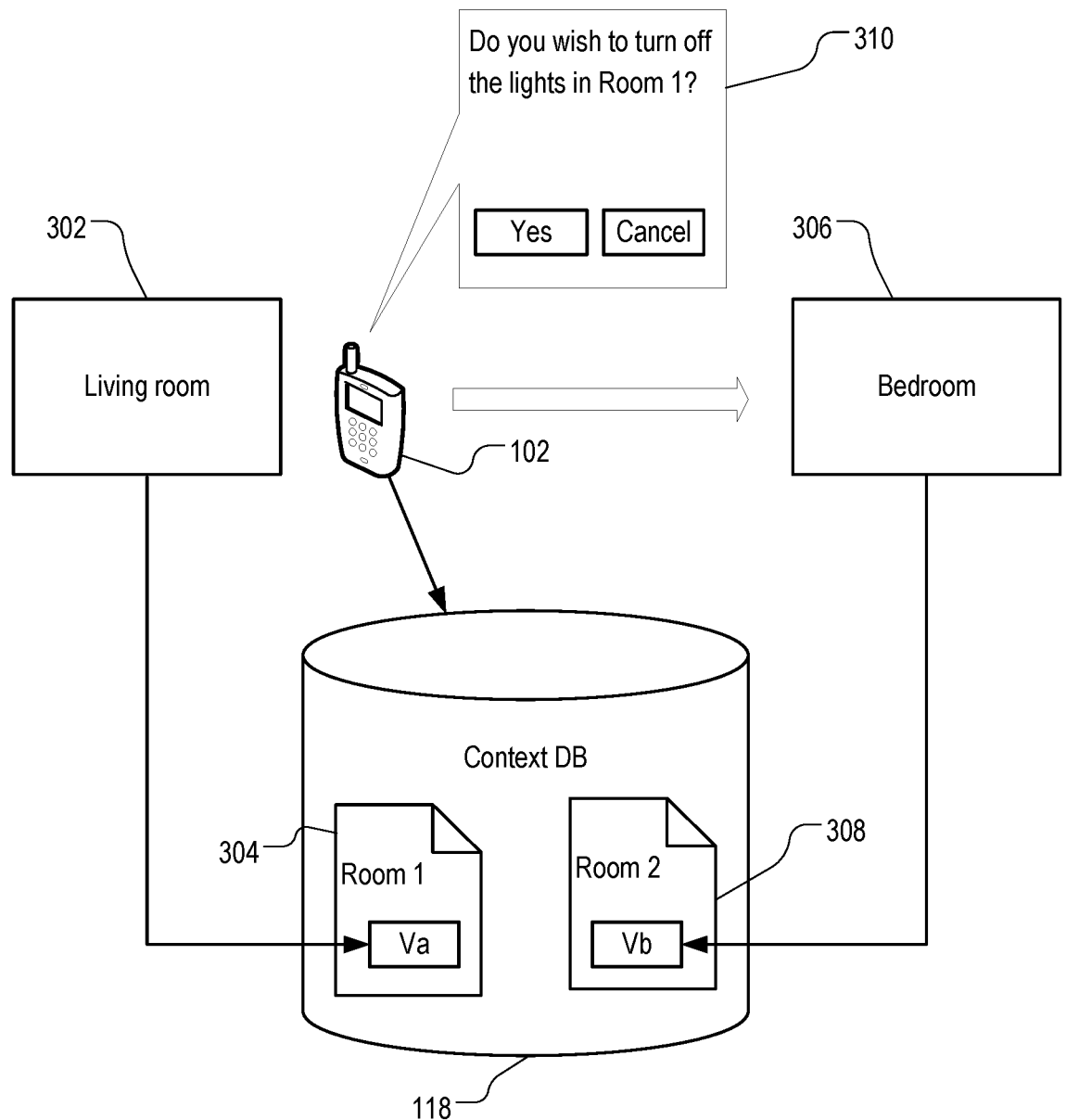
FIG. 3 is a diagram illustrating an exemplary mobile device detecting a transition of states of the mobile device based on context data.

FIG. 3 is a diagram illustrating exemplary mobile device 102 detecting a transition of states of mobile device 102 based on context data. The transition of states can be changing locations, changing environments or both. In certain situations, determining a precise location of mobile device 102 can be difficult or impossible. For example, mobile device 102 can be in a home or office where GPS signals are weak and no Wi-Fi™ access points are available for location determination. Using technology described below, mobile device 102 can determine transitions of states of mobile device 102, e.g., moving from one room to another, without knowing where mobile device 102 is physically located.

At a given time T0, mobile device 102 may be located in a particular room, e.g., living room 302 of a home. Mobile device 102 can record a set of sensor readings and store the sensor readings in context database 118 as context vector 304. Mobile device 102 can assign to context vector 304 a label that is generated by a device (e.g., a Bluetooth™ receiver of a sound system) located in living room 302. The label can be an identifier (e.g., a media access control (MAC) address), a user provided or default name (e.g., "Room 1") of a Bluetooth or NFC device or a string generated by mobile device 102. Mobile device 102 can store multiple context vectors associated with the label. The context vectors can include sensor readings taken at different time (e.g., daytime or nighttime, weekday or weekend) and having different characteristics (e.g., when lights are on or off). Mobile device 102 can aggregate the context vectors into a category related to living room 302 or aggregate the context vector into a single master context vector associated with living room 302.

Likewise, at a later time T1, mobile device 102 may be located in another room, e.g., bedroom 306. Mobile device 102 can take sensor readings and associate the sensor readings with a second label, e.g., "Room 2." Mobile device 102 can store the sensor readings and the associated label as context vector 308 in context database 118.

At a given later time Tx, mobile device 102 can determine that mobile device 102 is in a context that matches context vector 304 associated with label "Room 1." Mobile device 102 can make the determination by comparing sensor readings taken at or near time Tx with context vectors including context vector 304 stored in context database 118 and determining that the sensor readings match the readings of context vector 304. At a yet later time Ty, mobile device 102 can determine that mobile device 102 is in a context that matches context vector 308 having an associated label "Room 2." Accordingly, mobile device 102 can determine that mobile device 102 transitioned from "Room 1" to "Room 2" at a time between Tx and Ty.

Determining the transition can trigger mobile device 102 to perform various tasks. For example, mobile device 102 can determine that while mobile device 102 is in a context corresponding to label "Room 1" a light was turned on. Mobile device 102 can make the determination by determining that mobile device 102 was temporarily in a context that matches a label indicating a context that a light was turned on, or, in some implementations, by recording an action that mobile device 102 interacted with an external system (e.g., system 104 of FIG. 1) to turn on a light. Upon determining that mobile device 102 has made the transition mobile device 102 can display user interface 310. User interface 310 can include one or more options to turn off the light through interaction between mobile device 102 and the external system.

Figure 4:
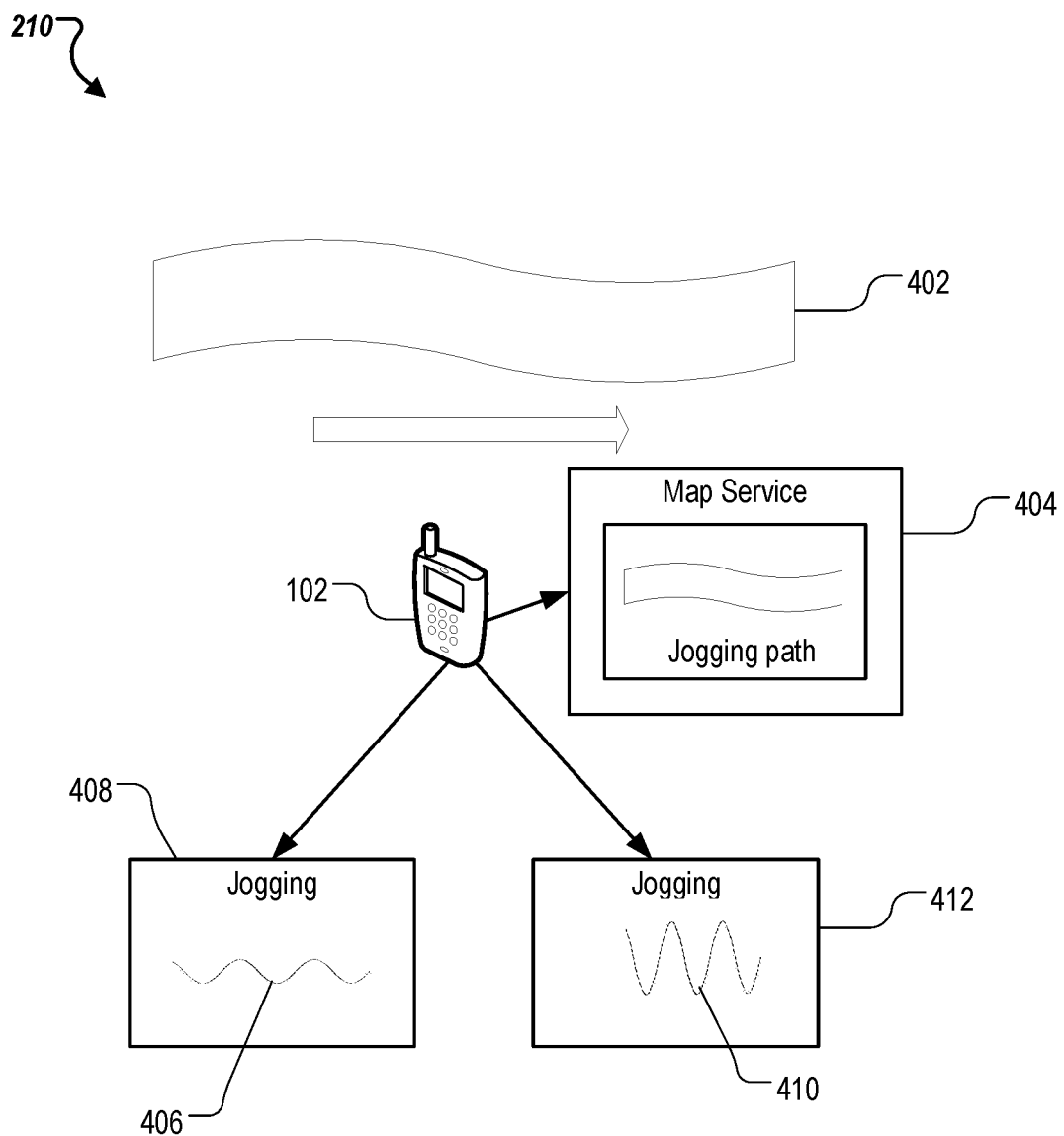
FIG. 4 is a diagram illustrating an exemplary mobile device determining a context of a user action using a map service.

FIG. 4 is a diagram illustrating exemplary mobile device 102 determining a context of a user action using a map service. Mobile device 102 may be carried by a user jogging along path 402. Many users may carry mobile devices while jogging, each in a different and unique way. Some users may customarily carry mobile devices in a pocket, running pouch or backpack. Some users may customarily fasten mobile devices to arms, legs or waists using elastic bands. Accordingly, movement patterns of mobile devices, while being carried jogging, may be very different for different users.

Mobile device 102, while being carried by a jogging user, may access map service 404. Through map service 404, mobile device 102 may determine that, for a given period of time, mobile device 102 travels along path 402, which is classified in map service 404 as a jogging path. Accordingly, mobile device 102 can associate a vector of sensor readings, e.g., motion sensor readings 406, with a label, e.g., "jogging," as provided by map service 404, and store the sensor vector and label as context vector 408.

Mobile device 102 may record an event associated with context vector 408. For example, mobile device 102 may record that when mobile device is on jogging path 402, a user of mobile device 102 has turned on a given feature of mobile device 102 one or more times, e.g., a heart rate monitoring application program. Accordingly, when mobile device 102 obtains sensor readings that match sensor readings 406 in context vector 408 mobile device 102 may provide a prompt that includes the label obtained from map service 404 (e.g., "jogging") and a user interface item asking a user whether the user wishes to turn on the feature, e.g., launch the heart rate monitoring application program. Providing the prompt can be triggered by the sensor reading match rather than location. Accordingly, mobile device 102 may provide the prompt upon detecting the motion pattern, even when mobile device 102 is not located on jogging path 402.

Recording the context vector 408 can be data driven and independent of a user's individual habit. For example, mobile device 102 may be carried by a second user along path 402. The second user may have a unique way of carrying mobile device 102 and a unique stride while jogging. Accordingly, mobile device 102 may associate sensor vector 410 with the label "jogging" and store them as context vector 412. Sensor vector 410 may have a pattern that is different from a pattern of sensor readings 406. Different context vectors 408 and 412 allow mobile device 102 to customize mobile device 102 to different users without being trained or manually configured by different users.

Figure 5:
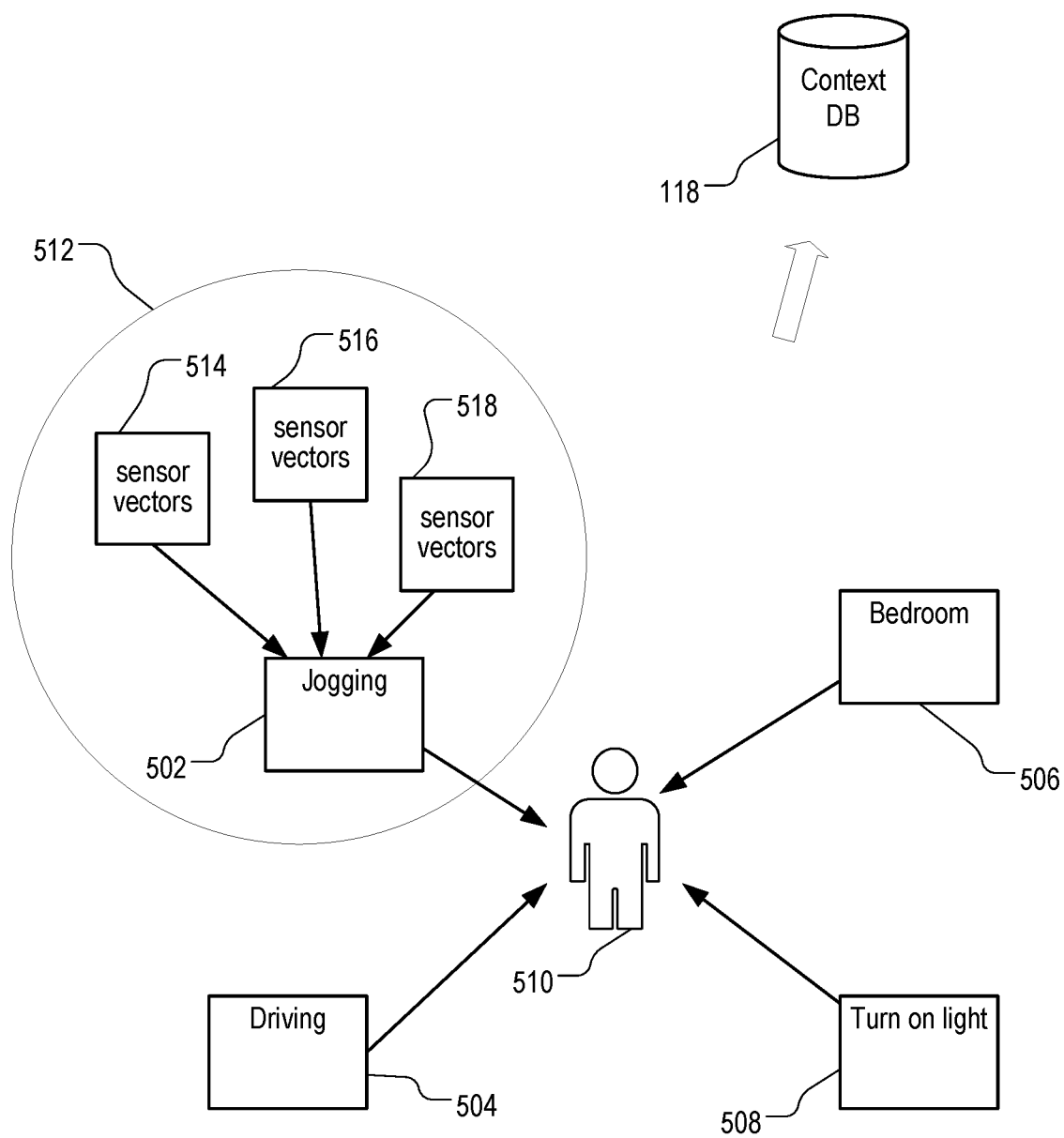
FIG. 5 is a diagram illustrating multiple contexts associated with a user by an exemplary mobile device.

FIG. 5 is a diagram illustrating multiple contexts associated with a user by exemplary mobile device 102. Context database 118 hosted on or coupled to mobile device 102 can store multiple context vectors for each of one or more users. For example, context database 118 can store context vectors 502, 504, 506, and 508 for user 510 identified by user identifier, e.g., a user name or a user's cloud identity. Each of context vectors 502, 504, 506, and 508 can include one or more representations of sensor readings associated with a label, e.g., "jogging," "driving," "bedroom," or "turn on light." Each representation can be actual sensor readings or a statistical representation of sensor readings, e.g., one or more of a mean, median, mode or deviation that is derived from a set of the sensor readings.

Mobile device 102 can determine the statistical representations using aggregation 512. Aggregation 512 can include determining the statistical representations using multiple sensor vectors, e.g., sensor vectors 514, 516, and 518 taken at various times. For example, for a number of X weekdays, mobile device 102 can determine that mobile device 102 is on jogging path 402 (of FIG. 4). Each time mobile device 102 is on jogging path 402, mobile device 102 can record a set of motion sensor readings. Mobile device 102 can determine that these motion sensor readings are sufficiently similar to one another by determining that differences between magnitude or frequency (e.g., computed by a Fast Fourier Transform (FFT)) of linear or angular accelerations in readings on day one and readings on day two are smaller than a threshold. Upon this determination, mobile device 102 can aggregate the readings of day one and day two, e.g., by calculating a mean and deviation of the magnitude or frequency, associate the aggregated readings with the label "jogging" to create context vector 502 and associate context vector 502 with user 510 who may be the registered user of mobile device 102.

Exemplary Device Components

Figure 6:
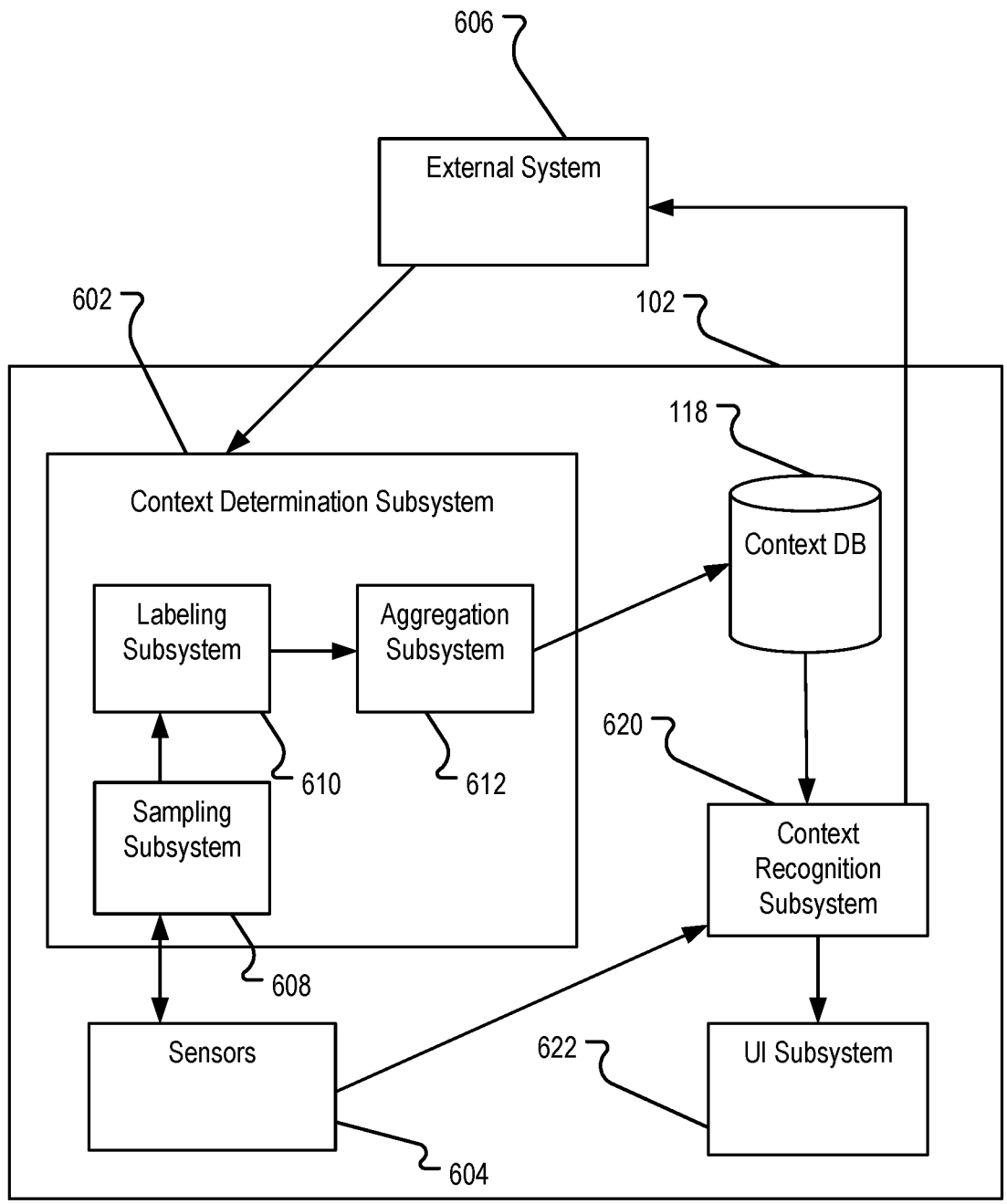
FIG. 6 is a block diagram illustrating components of an exemplary mobile device determining and using context data.

FIG. 6 is a block diagram illustrating components of exemplary mobile device 102 determining and using context data. Each component of exemplary mobile device 102 can include hardware and software, firmware, or cloudware components.

Mobile device 102 can include context determination subsystem 602. Context determination subsystem 602 is a component of mobile device 102 configured to determine one or more context vectors for a user. Context determination subsystem 602 can receive a user input enabling context determination functions of mobile device 102. Upon receiving the input, context determination subsystem 602 can enable context determining functions by recording readings from one or more sensors 604 of mobile device 102 as sensor vectors.

Recording readings from one or more sensors 604 of mobile device 102 can be triggered by the user input or be triggered by interactions between mobile device 102 and external system 606. External system 606 can include a system that can provide a label of a user action or information for constructing a label of a user action. For example, external system 606 can include a smart home controlling system, a Bluetooth device or a map service as described above.

Context determining subsystem 602 can include sampling subsystem 608. Sampling subsystem 608 is a component of context determining subsystem 602 configured to interact with sensors 604, including turning on or off each of the sensors 604 and receiving the readings from the sensors 604. Sampling subsystem 608 can provide the readings to labeling subsystem 610 as sensor vectors.

Labeling subsystem 610 is a component of context determination subsystem 602 configured to associate a label with the sensor vectors provided by sampling subsystem 608. Labeling subsystem 610 can receive the label from external subsystem 606 or determine the label from information provided by external subsystem 606, for example, by hashing an identifier provided by external subsystem 606. Labeling subsystem 610 can provide the sensor-reading vectors associated with the label to aggregation subsystem 612.

Aggregation subsystem 612 is a component of context determination subsystem 602 configured to perform aggregation 512 on multiple sensor vectors as described above in reference to FIG. 5. Result of the operations of aggregation subsystem 612 can include one or more context vectors. Aggregation subsystem 612 can store the context vectors in context database 118. Context database 118 can be a subsystem of mobile device 102 including one or more storage devices or a database located remotely from mobile device 102 and connected to mobile device 102 through a communications network.

Mobile device 102 can include context recognition subsystem 620. Context recognition subsystem 620 is a component of mobile device 102 configured to receive readings from sensors 604, compare the received readings with context vectors stored in context database 118 and determine if mobile device 102 is in a particular context if the comparison results in a match. Upon determining that mobile device 102 is in a particular context, context recognition subsystem can call a system function or launch an application program that is previously associated with the context by user input or by learning by mobile device 102 from past user actions. In some implementations, calling the system function or launching the application program can trigger user interface subsystem 622 to present a visual, audio or tactile output. In some implementations, calling the system function or launching the application program can trigger communication between mobile device 102 and external system 606 to cause external system 606 to perform an action, e.g., turning on or off a light or an electric appliance.

Figure 7:
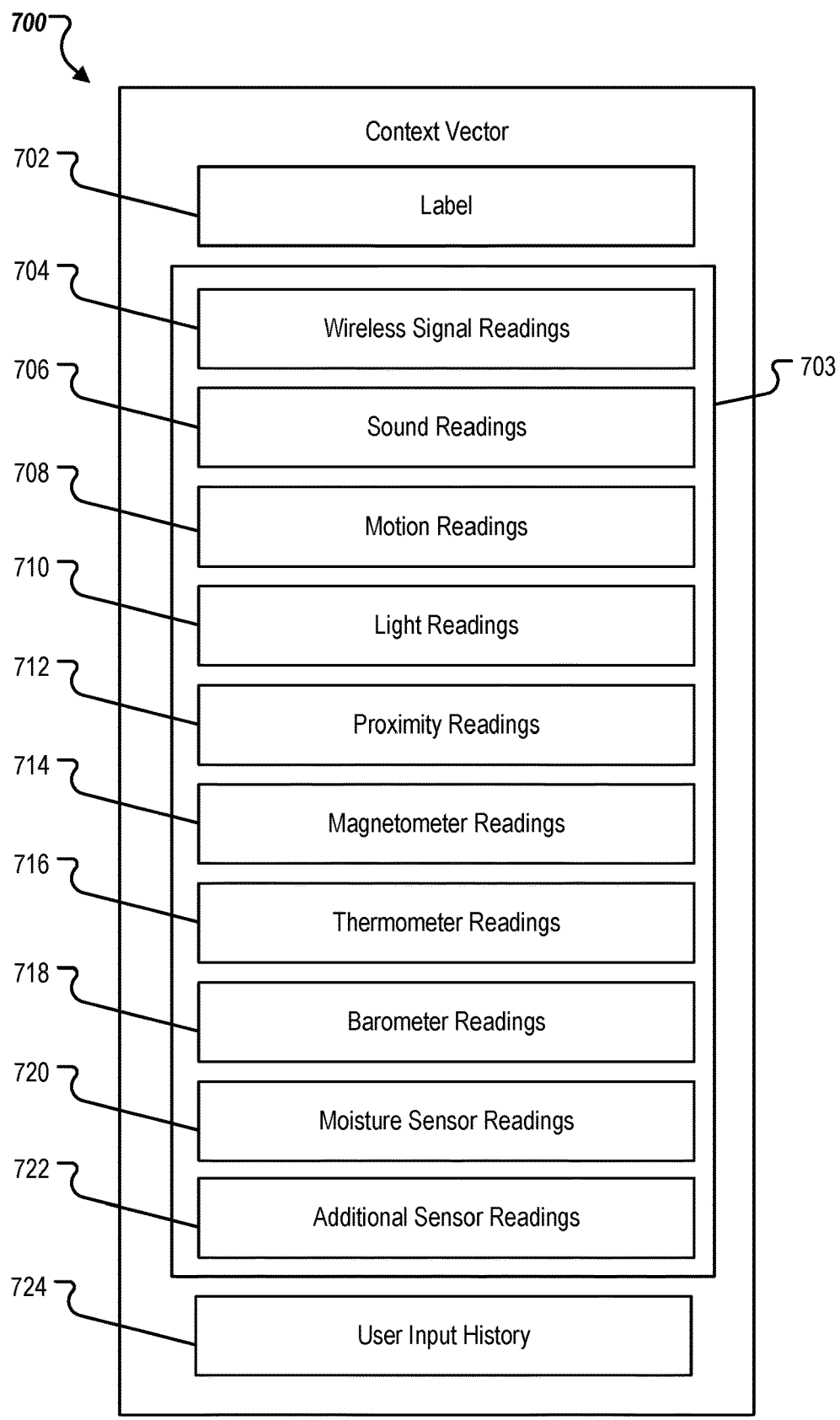
FIG. 7 is a block diagram illustrating an exemplary structure of a context vector.

FIG. 7 is a block diagram illustrating an exemplary structure 700 of a context vector. The context vector can be stored in a context database 118 of FIG. 1.

The context vector can include, or otherwise be associated with label 702. Label 702 can be a text string, a markup language tag or a binary identifier. The context vector can include one or more sensor vectors 703. Sensor readings 703 can include actual readings from sensors of a mobile device, e.g., mobile device 102 of FIG. 1 or statistical representations of the actual sensor readings.

Sensor vector 703 can include wireless signal readings 704. Wireless signal readings 704 can include RSSI values of one or more signal sources as measured by a wireless receiver of the mobile device. The RSSI values can be associated with identifiers, e.g., media access control (MAC) addresses of the corresponding signal sources. The RSSI values can include RSSI values of signals from, for example, wireless access points (APs), NFC beacons, cellular towers, Bluetooth™ devices or Bluetooth low energy (BLE) beacons.

Sensor vector 703 can include sound readings 706. Sound readings 706 can include measurements of ambient sound taken by a microphone of the mobile device. The measurements can include particular patterns of sounds from various activities. For example, a user activity of turning on a stove can include a click of lighter, which can generate a particular sound. The mobile device can record the particular sound, or a frequency, an amplitude, and a duration of the particular sound and store the recorded values or a statistical representation (e.g., a mean and variance) of the values as sound readings 706.

Sensor vector 703 can include motion readings 708. Motion readings 708 can include lateral or angular accelerations taken by one or more motion sensors of the mobile device. Motion readings 708 can include a direction vector in a three-dimensional space, amplitude, duration, and frequency of the accelerations.

Sensor vector 703 can include light readings 710. Light readings 710 can include measurements taken from a light sensor of the mobile device. The measurements can include measurements of intensity and color readings of the light sensor.

Sensor vector 703 can include proximity readings 712. Proximity readings 712 can include measurements taken from a proximity sensor of the mobile device. The measurement can indicate a duration that the mobile device is located within a threshold distance to an object such that the proximity sensor can detect the object, a distance between the mobile device and the object and an angle at which the mobile device is facing the object.

Sensor vector 703 can include magnetometer readings 714. Magnetometer readings 714 can include measurements of a magnetometer of the mobile device. The measurements can include measurements on magnitude, direction, and rate of change of a magnetic field in which the mobile device is located.

Sensor vector 703 can include thermometer readings 716. Thermometer readings 716 can include temperature measurements taken by a thermometer of the mobile device. Sensor readings 703 can include barometer readings 718. Barometer readings 718 can include measurements of atmospheric pressure taken by a barometer of the mobile device. Sensor vector 703 can include moisture sensor readings 720. Moisture sensor readings 720 can include measurement of humidity in the air taken by a moisture sensor, e.g., a hygrometer, of the mobile device.

Sensor vector 703 can include additional sensor readings 722. Additional sensor readings can include measurement of various environment variables taken by sensors of the mobile device or sensors connected to the mobile device. These sensors can include, for example, a heart rate monitor, a multimeter probe, a blood pressure sensor, a GPS receiver or a breath analyzer. The mobile device can designate various combinations of the sensor vector 703 as a context. In some implementations, the absence of some readings, like the presence of some readings, can form part of the context. For example, the mobile device can determine that the absence of GPS signals indicates a context in which the mobile device is located indoors.

Context vector 700 can include user input history 724. User input history 724 can include a set of records each representing a user action. The user action can include, for example, a search request including a search term, turning on or off an appliance, selecting a channel on a television, shutting down the mobile device or setting the mobile device to airplane mode where a wireless transceiver of the mobile device is turned off. The mobile device can associate user input history 724 with label 702 and sensor vector 703 to estimate what the user will do when the mobile device is in a same context, e.g., when the mobile device encounters sensor readings that are similar to those of sensor vector 703.

Exemplary Procedures

Figure 8:
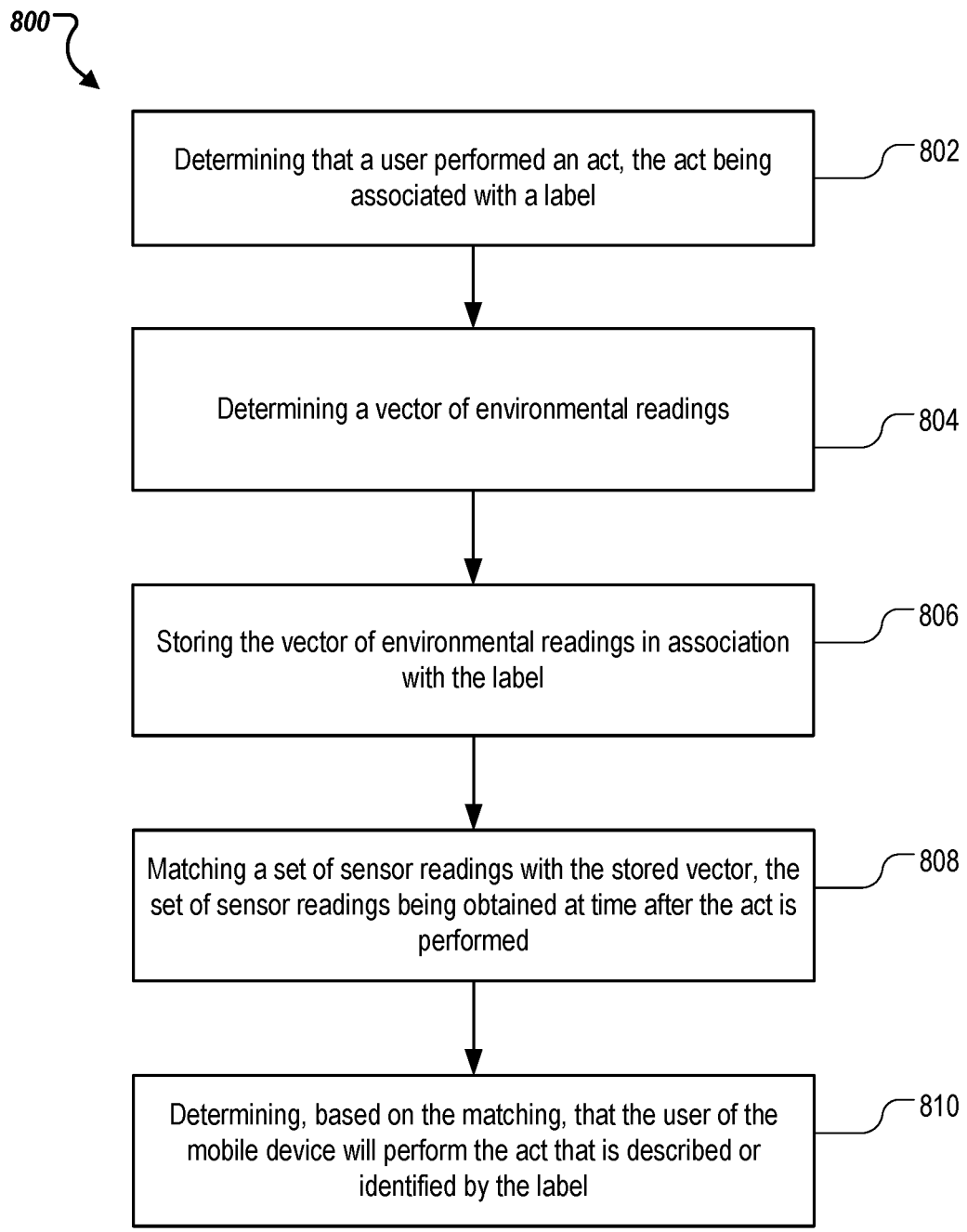
FIG. 8 is a flowchart of an exemplary process of determining and using context data.

FIG. 8 is a flowchart of an exemplary process of determining and using context data. A mobile device, e.g., mobile device 102 of FIG. 1 can perform process 800. In some implementations, process 800 can be performed by one or more server computers connected to the mobile device.

The mobile device can interact with a system external to the mobile device. The mobile device can determine (802) that a user of the mobile device performed an act, the act being associated with a label describing or identifying the act. The label can be supplied by the system external to the mobile device at time the user performs the act. The external system can be configured to control one or more electric appliances of a home or an office. The act can include an act of turning on or off an electric appliance of the home or office, or an act of adjusting an electric appliance of the home or office.

In some implementations, the label can be obtained by the mobile device from an external map information system upon determining, by the mobile device, that the mobile device has transitioned from a first geographic area represented in the map to a second geographic area represented in the map. The label describing or identifying the act can include information on the first geographic area or information on the second geographic area. For example, the mobile device can determine that the mobile device transitioned from a home to an office through a jogging path or biking path. The map information system can provide a name of the path or a description (e.g., jogging or biking) of the path. The label can include the name or description.

In response to determining that the user performed the act, the mobile device can determine (804) a vector of environmental readings obtained by one or more sensors of the mobile device at time the act is performed. The vector can be exemplary context vector 700 described in reference to FIG. 7. Determining the vector of environmental readings can include aggregating the environmental readings with previously recorded environmental readings associated with a same label. In some implementations, determining the vector of environmental readings can be triggered upon determining that the user performed the act. Determining the vector of environmental readings can occur without prompting the user to enter the label.

The mobile device can store (806) the vector of environmental readings in association with the label on a storage device. The vector can include at least one of the following: readings from a wireless receiver of the mobile device measuring received signal strength, readings of ambient sound from a microphone of the mobile device, readings of linear or angular accelerations of the mobile device from a motion sensor of the mobile device, readings from a light sensor of the mobile device, readings from a proximity sensor of the mobile device or readings from a magnetometer of the mobile device.

The mobile device can match (808) a set of sensor readings with the stored vector. The mobile device can obtain the set of sensor readings at time after the act is performed. Matching the set of sensor readings obtained at time after the act is performed with the stored vector can include performing a statistical match and determining a probability that the set of sensor readings obtained at a time after the act is performed corresponds to the act satisfies a pre-specified threshold value.

The mobile device can determine (810), based on the matching, that the user of the mobile device will perform the act that is described or identified by the label associated with the stored vector. Upon determining that the user of the mobile device will perform the act, the mobile device can present a user interface item to the user prompting the user to turn on, turn off, or adjust an electronic appliance or execute a user-specified application program.

Exemplary Mobile Device Architecture

Figure 9:
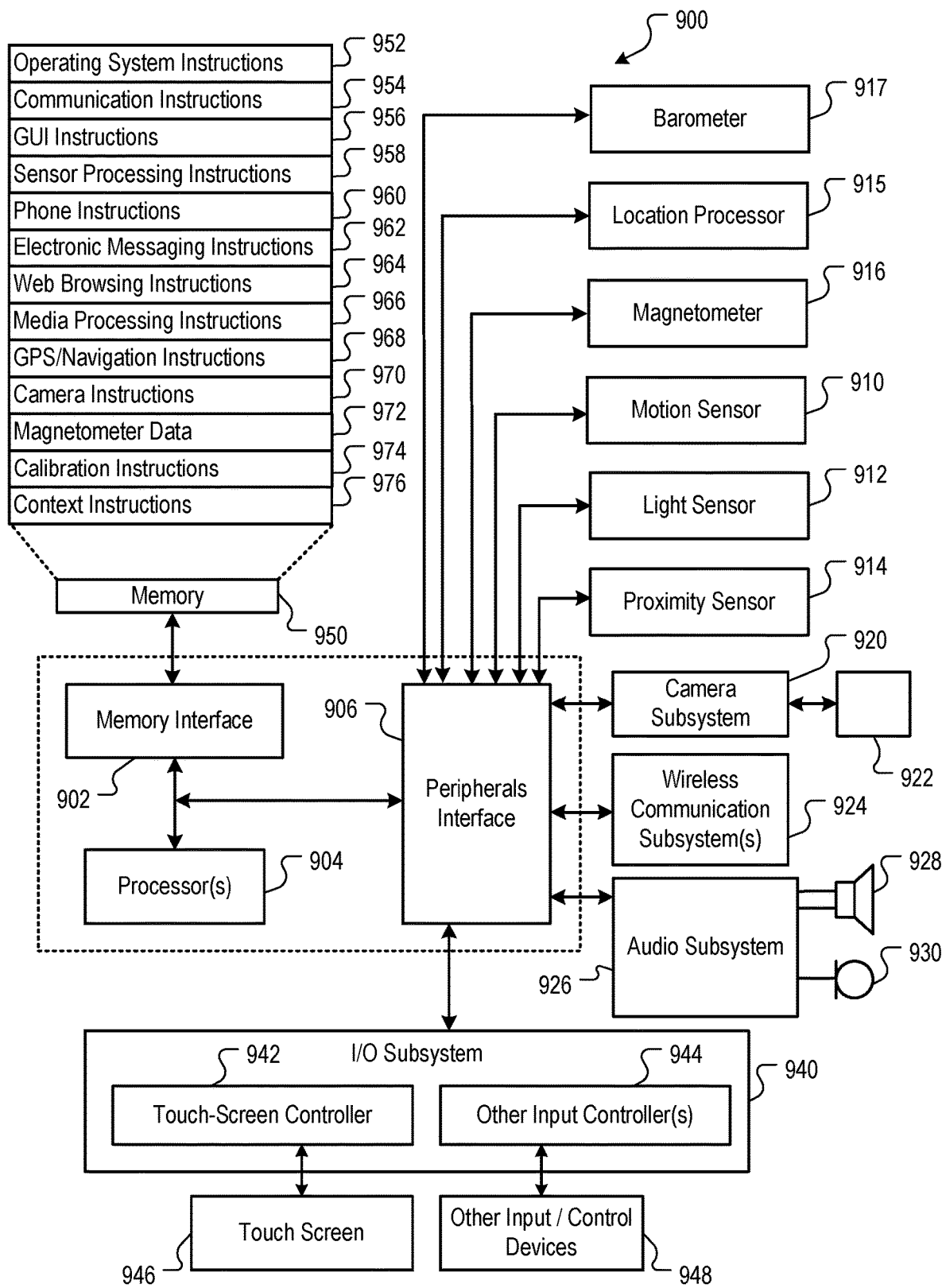
FIG. 9 is a block diagram illustrating an exemplary device architecture of a mobile device implementing the features and operations described in reference to FIGS. 1-8.

FIG. 9 is a block diagram of an exemplary architecture 900 for the mobile devices of FIGS. 1-8. A mobile device (e.g., mobile device 102) can include memory interface 902, one or more data processors, image processors and/or processors 904, and peripherals interface 906. Memory interface 902, one or more processors 904 and/or peripherals interface 906 can be separate components or can be integrated in one or more integrated circuits. Processors 904 can include application processors, baseband processors, and wireless processors. The various components in mobile device 102, for example, can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate orientation, lighting, and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Motion sensor 910 can include one or more accelerometers configured to determine change of speed and direction of movement of the mobile device. Barometer 917 can include one or more devices connected to peripherals interface 906 and configured to measure pressure of atmosphere around the mobile device.

Camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a GSM network, a GPRS network, an EDGE network, a Wi-Fi™ or WiMax™ network, and a Bluetooth™ network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions. Audio subsystem 926 can be configured to receive voice commands from the user.

I/O subsystem 940 can include touch surface controller 942 and/or other input controller(s) 944. Touch surface controller 942 can be coupled to a touch surface 946 or pad. Touch surface 946 and touch surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 946. Touch surface 946 can include, for example, a touch screen.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch surface 946; and a pressing of the button for a second duration that is longer than the first duration may turn power to mobile device 102 on or off. The user may be able to customize a functionality of one or more of the buttons. The touch surface 946 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as iOS, Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions; camera instructions 970 to facilitate camera-related processes and functions; magnetometer data 972 and calibration instructions 974 to facilitate magnetometer calibration. The memory 950 may also store other software instructions (not shown), such as security instructions, web video instructions to facilitate web video-related processes and functions, and/or web-shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 950. Memory 950 can store context instructions 976 that, when executed, can cause processor 904 to perform operations of determining a context of a mobile device and matching sensor readings with the context, including the operations described in FIGS. 1-8.

Each of the above identified instructions and applications can correspond to a set of instructions for performing one or more functions described above. These instructions need not be implemented as separate software programs, procedures, or modules. Memory 950 can include additional instructions or fewer instructions. Furthermore, various functions of the mobile device may be implemented in hardware and/or in software, including in one or more signal processing and/or application specific integrated circuits.

Exemplary Operating Environment

Figure 10:
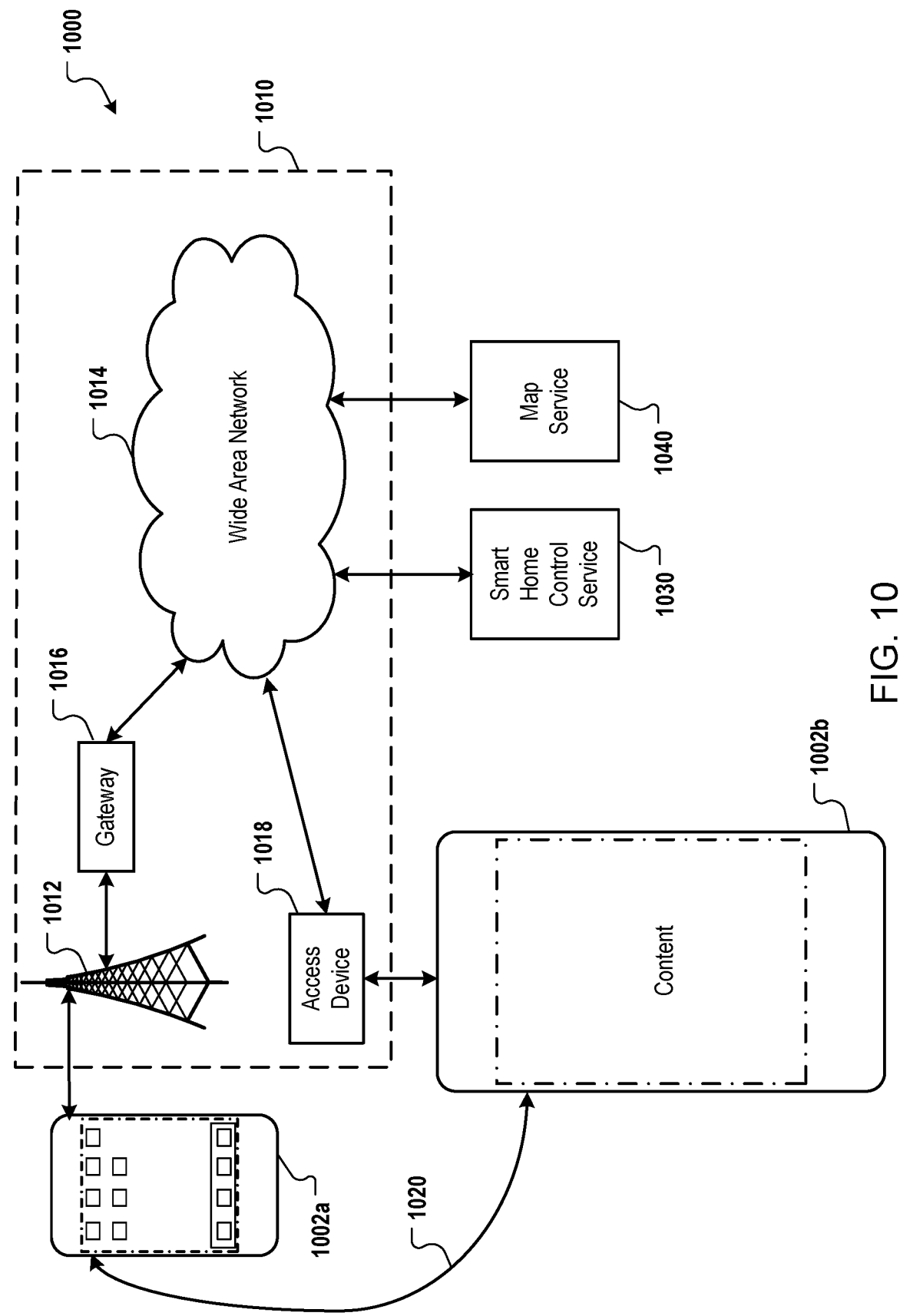
FIG. 10 is a block diagram of an exemplary network operating environment for the mobile devices of FIGS. 1-8.

FIG. 10 is a block diagram of an exemplary network operating environment 1000 for the mobile devices of FIGS. 1-8. Mobile devices 1002a and 1002b can, for example, communicate over one or more wired and/or wireless networks 1010 in data communication. For example, a wireless network 1012, e.g., a cellular network, can communicate with a wide area network (WAN) 1014, such as the Internet, by use of a gateway 1016. Likewise, an access device 1018, such as an 802.11g or 802.11n wireless access point, can provide communication access to the wide area network 1014. Each of mobile devices 1002a and 1002b can be mobile device 102 as described above in reference to FIGS. 1-8.

In some implementations, both voice and data communications can be established over wireless network 1012 and the access device 1018. For example, mobile device 1002a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1012, gateway 1016, and wide area network 1014 (e.g., using Transmission Control Protocol/Internet Protocol (TCP/IP) or User Datagram Protocol (UDP)). Likewise, in some implementations, the mobile device 1002b can place and receive phone calls, send and receive e-mail messages, and retrieve electronic documents over the access device 1018 and the wide area network 1014. In some implementations, mobile device 1002a or 1002b can be physically connected to the access device 1018 using one or more cables and the access device 1018 can be a personal computer. In this configuration, mobile device 1002a or 1002b can be referred to as a "tethered" device.

Mobile devices 1002a and 1002b can also establish communications by other means. For example, wireless device 1002a can communicate with other wireless devices, e.g., other mobile devices, cell phones, etc., over the wireless network 1012. Likewise, mobile devices 1002a and 1002b can establish peer-to-peer communications 1020, e.g., a personal area network, by use of one or more communication subsystems, such as the Bluetooth™ communication devices. Other communication protocols and topologies can also be implemented.

The mobile device 1002a or 1002b can, for example, communicate with one or more services 1030 and 1040 over the one or more wired and/or wireless networks. For example, one or more smart home services 1030 can allow mobile devices 1002a and 1002b to control a home appliance remotely. Map service 1040 can provide information, e.g., a name or a classification that can be used as a label, of a location visited by the mobile devices 1002a and 1002b.

Mobile device 1002a or 1002b can also access other data and content over the one or more wired and/or wireless networks. For example, content publishers, such as news sites, Really Simple Syndication (RSS) feeds, web sites, blogs, social networking sites, developer networks, etc., can be accessed by mobile device 1002a or 1002b. Such access can be provided by invocation of a web browsing function or application (e.g., a browser) in response to a user touching, for example, a Web object.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A number of implementations of the invention have been described. Nevertheless, it will be understood that various modifications can be made without departing from the spirit and scope of the invention.

What is claimed is:

1. A method comprising:
by a mobile device interacting with a smart home control system configured to control one or more electric appliances:
determining that a first interaction with the smart home control system has been received via a user interface on a display of the mobile device;
assigning a label describing or identifying the first interaction, the label supplied by the smart home control system;
determining a vector of environmental readings obtained by one or more sensors of the mobile device at a time of the first interaction;
associating the label with the vector of environmental readings obtained at the time of the first interaction;
at a time after the first interaction, matching a set of sensor readings with the vector of environmental readings obtained at the time of the first interaction;
predicting, based on the matching, that a second interaction will be performed, the second interaction described or identified by the label associated with the vector of environmental readings;
identifying the user interface of the mobile device through which the first interaction is received; and
presenting, based on the predicting, the user interface on the display of the mobile device to receive selections associated with the second interaction with the smart home control system.

2. The method of claim 1, wherein the label is supplied by the smart home control system at time of the first interaction.

3. The method of claim 2, wherein the first interaction includes turning on or off an electric appliance of the one or more electric appliances.

4. The method as in claim 2, wherein the first interaction includes adjusting an electric appliance of the one or more electric appliances.

5. The method of claim 1, wherein the label is obtained by the mobile device from an external map information system upon determining, by the mobile device, that the mobile device has transitioned from a first geographic area represented in the map to a second geographic area represented in the map, wherein the label describing or identifying the first interaction includes information on the first geographic area or information on the second geographic area.

6. The method of claim 1, wherein the vector of environmental readings comprises readings of ambient sound from a microphone of the mobile device.

7. The method of claim 1, wherein determining the vector of environmental readings comprises aggregating the environmental readings with previously recorded environmental readings associated with a same label.

8. The method of claim 7, further comprising determining the vector of environmental readings in response to receipt of the first interaction with the smart home control system, wherein determining the vector of environmental readings occurs without displaying a prompt to facilitate entry of the label.

9. The method of claim 8, wherein matching the set of sensor readings with the vector of environmental readings comprises, after the first interaction, obtaining the set of sensor readings and determining a probability that the set of sensor readings obtained after the first interaction corresponds with the set of sensor readings associated with the vector of environmental readings.

10. A system on a mobile device interacting with a smart home control system configured to control one or more electric appliances, the system comprising:
one or more processors; and
a memory device to store instructions for execution by the one or more processors, wherein the instructions cause the one or more processors to perform operations comprising:
determining that a first interaction with the smart home control system has been received via a user interface on a display of the mobile device;
assigning a label describing or identifying the first interaction, the label supplied by the smart home control system;
determining a vector of environmental readings obtained by one or more sensors of the mobile device at a time of the first interaction;
associating the label with the vector of environmental readings obtained at the time of the first interaction;
at a time after the first interaction, matching a set of sensor readings with the vector of environmental readings obtained at the time of the first interaction;
predicting, based on the matching, that a second interaction will be performed, the second interaction described or identified by the label associated with the vector of environmental readings;
identifying the user interface of the mobile device through which the first interaction is received; and
presenting, based on the predicting, the user interface on the display of the mobile device to receive selections associated with the second interaction with the smart home control system.

11. The system of claim 10, wherein the label is supplied by the smart home control system at time of the first interaction and the first interaction includes turning on or off an electric appliance of the one or more electric appliances.

12. The system as in claim 10, wherein the label is supplied by the smart home control system at time of the first interaction and the first interaction includes adjusting an electric appliance of the one or more electric appliances.

13. The system of claim 10, wherein the label is obtained by the mobile device from an external map information system upon determining that the mobile device has transitioned from a first geographic area represented in the map to a second geographic area represented in the map, wherein the label describing or identifying the first interaction includes information on the first geographic area or information on the second geographic area.

14. The system of claim 10, the operations further comprising determining the vector of environmental readings in response to receipt of the first interaction with the smart home control system, wherein determining the vector of environmental readings comprises aggregating the environmental readings with previously recorded environmental readings associated with a same label without displaying a prompt to facilitate entry of the label.

15. The system of claim 14, wherein the vector of environmental readings comprises readings of ambient sound from a microphone of the mobile device.

16. A non-transitory computer-readable medium storing instructions that, when executed by one or more processors of a mobile device, cause the one or more processors of the mobile device to perform operations to interact with a smart home control system configured to control one or more electric appliances, the operations comprising:
determining that a first interaction with the smart home control system has been received via a user interface on a display of the mobile device;
assigning a label describing or identifying the first interaction, the label supplied by the smart home control system;
determining a vector of environmental readings obtained by one or more sensors of the mobile device at a time of the first interaction;
associating the label with the vector of environmental readings obtained at the time of the first interaction;
at a time after the first interaction, matching a set of sensor readings with the vector of environmental readings obtained at the time of the first interaction;
predicting, based on the matching, that a second interaction will be performed, the second interaction described or identified by the label associated with the vector of environmental readings;
identifying the user interface of the mobile device through which the first interaction is received; and
presenting, based on the predicting, the user interface on the display of the mobile device to receive selections associated with the second interaction with the smart home control system.

17. The non-transitory computer-readable medium of claim 16, wherein the label is supplied by the smart home control system at time of the first interaction.

18. The non-transitory computer-readable medium of claim 16, wherein the label is obtained by the mobile device from an external map information system upon determining that the mobile device has transitioned from a first geographic area represented in the map to a second geographic area represented in the map, wherein the label describing or identifying the first interaction includes information on the first geographic area or information on the second geographic area.

19. The non-transitory computer-readable medium of claim 16, the operations further comprising determining the vector of environmental readings in response to receipt of the first interaction with the smart home control system, wherein determining the vector of environmental readings comprises aggregating the environmental readings with previously recorded environmental readings associated with a same label.

20. The non-transitory computer-readable medium of claim 19, wherein matching the set of sensor readings with the vector of environmental readings comprises, after the first interaction, obtaining the set of sensor readings and determining a probability that the set of sensor readings obtained after the first interaction corresponds with the set of sensor readings associated with the vector of environmental readings.

* * * * *